United States Patent
Billett

(10) Patent No.: US 7,695,373 B1
(45) Date of Patent: Apr. 13, 2010

(54) EXPANDABLE UNIVERSAL-JOINT BOOT

(76) Inventor: Ronald Jesse Billett, 1088 Keltner Ave., San Jose, CA (US) 95117

( * ) Notice: Subject to any disclaimer, the term of this patent is extended or adjusted under 35 U.S.C. 154(b) by 0 days.

(21) Appl. No.: 12/150,701

(22) Filed: May 1, 2008

(51) Int. Cl.
  *F16D 3/84* (2006.01)
(52) U.S. Cl. .................................. 464/175; 277/636
(58) Field of Classification Search ......... 464/173–175; 277/635, 636; 383/36, 88, 71, 82
  See application file for complete search history.

(56) References Cited

U.S. PATENT DOCUMENTS

| | | | | |
|---|---|---|---|---|
| 958,862 | A | * | 5/1910 | Durham ................. 464/173 X |
| 2,682,904 | A | * | 7/1954 | Divine ...................... 383/71 |
| 4,639,159 | A | * | 1/1987 | Amrath .................... 277/636 |
| 5,645,286 | A | | 7/1997 | Katoh |
| 5,845,911 | A | | 12/1998 | Gimino |
| 6,085,797 | A | | 7/2000 | Grabaum et al. |
| 6,139,027 | A | | 10/2000 | Biekx |
| 6,234,488 | B1 | * | 5/2001 | Martin et al. ........... 277/635 X |
| 2003/0137078 | A1 | | 7/2003 | Saito et al. |
| 2004/0204253 | A1 | * | 10/2004 | Wohlschlegel .............. 464/173 |
| 2004/0261238 | A1 | | 12/2004 | Boudreault |

* cited by examiner

*Primary Examiner*—Greg Binda

(57) ABSTRACT

A type of flexible boot sized to envelop an object mounted on a smaller shaft with one or both ends of the boot having an expandable opening. When used to protect an automotive type constant velocity joint, the boot will have one plain cylindrical end and one pleated end. The plain end of the boot mates to a housing of the CV joint, the opposite end mates to its input shaft. The shaft mating end of the boot is comprised of a circumference of radially arranged shaped pleats. During installation of the boot over the constant velocity joint, the pleated end of the boot may be spread apart and passed over the larger diameter of the joint housing. The pleats may then be closed inwardly to a nested condition where they are constrained and compacted to the shaft with a surrounding band clamp.

4 Claims, 3 Drawing Sheets

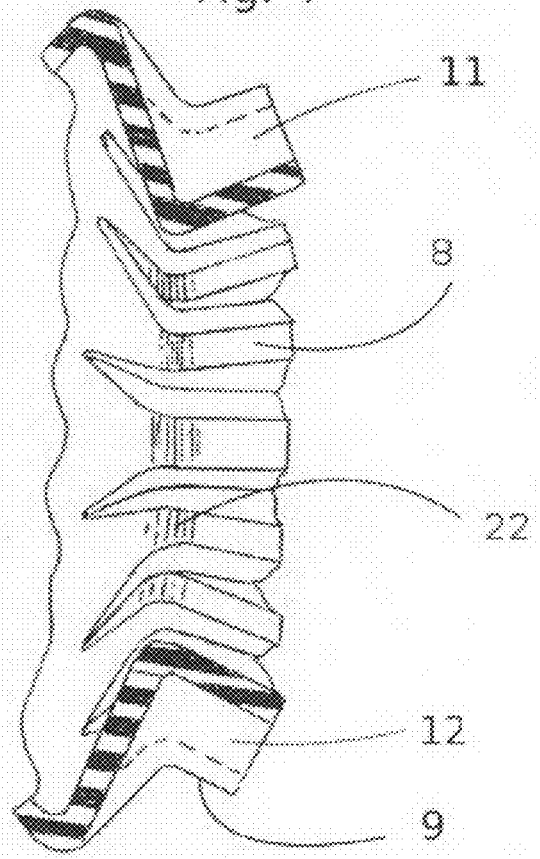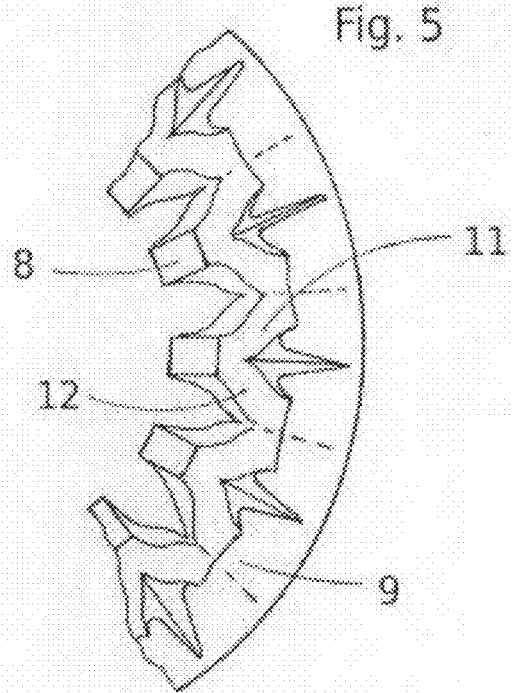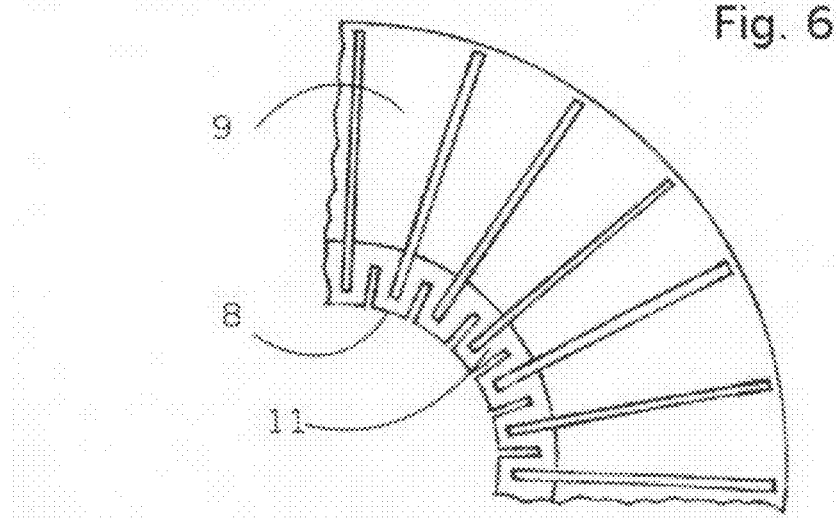

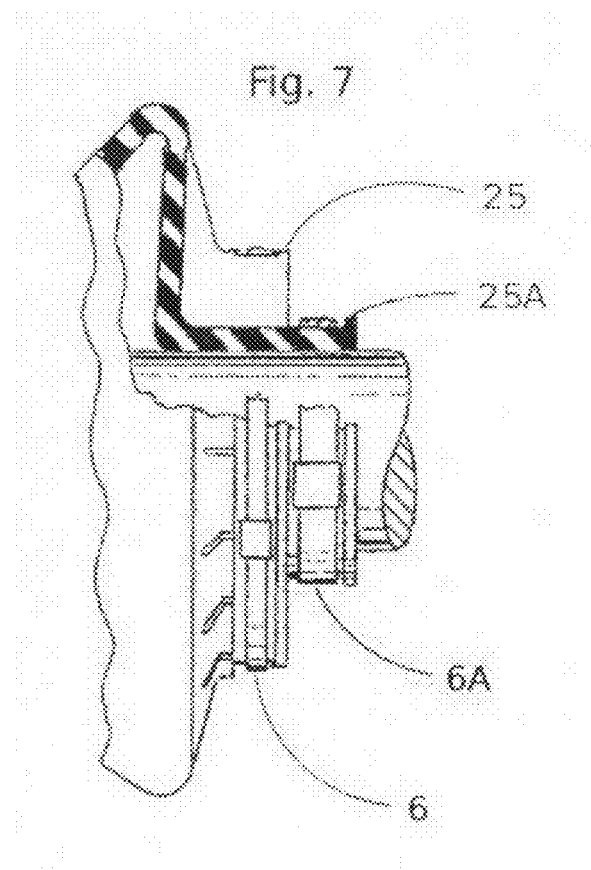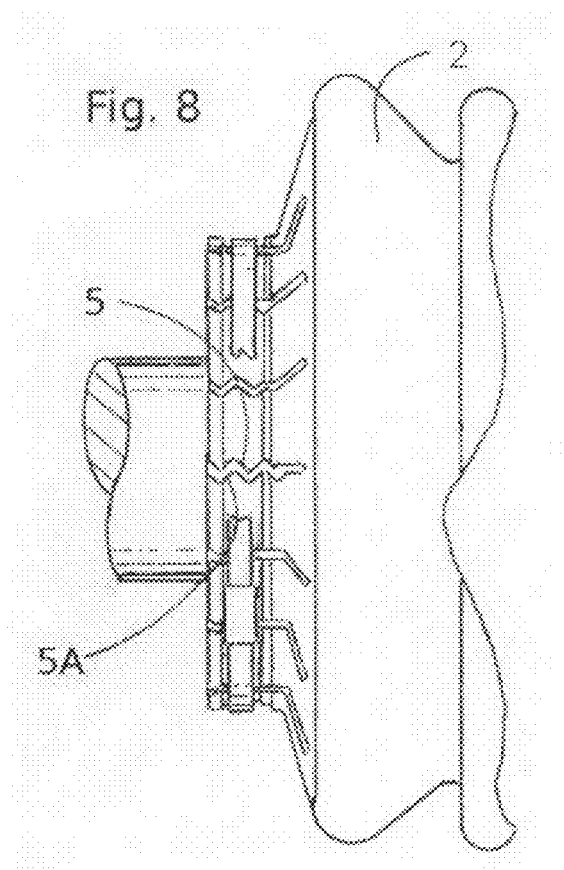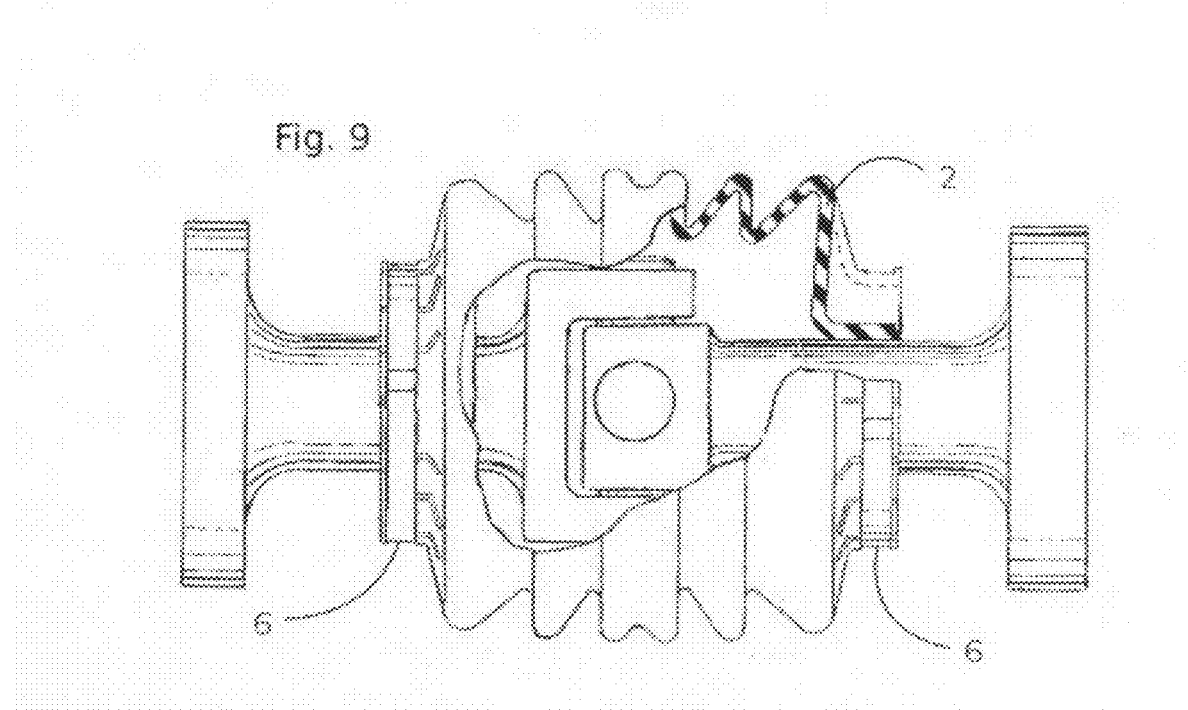

EXPANDABLE UNIVERSAL-JOINT BOOT

BACKGROUND OF THE INVENTION

1. Field of the Invention

The tubular expandable cover disclosed herein is in the field of flexible elastomeric or rubber type envelopes used to contain and protect machine parts. These sleeve-like devices are generally known as boots, and are usually tapered and convoluted in form. An important use for such boots is to protect the constant velocity ("C-V") joints as used in modern automobile drive axles.

2. Prior Art

A typical automobile half axle will carry both an inner and an outer C-V joint each protected by boots. The boots are necessary to retain lubricants and prevent entry of foreign materials. Performance requirements are high, and include longevity, flexibility, limited stretchability, chemical resistance, tolerance to high heat and freezing cold, and the toughness necessary to resist road debris. The outer boot is particularly vulnerable due both to its exposure and the extreme flexing required during steering. Presently there are no sensors available to monitor the condition of the boot and communicate this knowledge to the operator. Unfortunately when the protection of the boot is lost the C-V joint will have a short remaining life.

These requirements have generated a large number of material and conformation studies in an attempt to prevent premature boot failure. Many improvements appear to have come in new materials rather than new structure. In the case of materials, examples of such efforts can be seen in patent application publication 20030137078 to Katoh and U.S. Pat. No. 6,085,797 by Grabaum et al., among many others. For examples of structural changes, U.S. Pat. No. 5,645,286 by Katoh, and U.S. Pat. No. 5,236,394 by Collins et al., can be seen—again among many others. Despite these efforts, boot failure is an ongoing problem due primarily to the inherent fragility of the boot, its harsh usage and exposure to road debris. The material of such boots inevitably degrades with extended use. Therefore it is very probable that boot replacement will be required at some time during the life of most automobiles.

However, boot replacement is difficult because the C-V joint housings at each end of the automotive half-axle are much larger than the interior shaft. It follows that without C-V joint dis-assembly, the shaft sized end of the boot must be passed over the joint housing. This invention allows the boot to expand readily to make this transition, thereby significantly easing the job of boot replacement, particularly when skilled help or special tooling is not available.

While the boot was primarily conceived as a means for ready boot replacement, particularly under field conditions, it will be clear that a boot having this expandable characteristic will also offer significant cost savings to a manufacturer of the drive axles themselves.

Presently, failed C-V boots may be replaced in several ways, one being to remove the entire shaft and replace the boots on the bench. This procedure often requires draining the differential oil, separating a wheel and part of the suspension, then sliding the shaft inner spline through an "O" ring case seal, and finally dis-assembly of at least one C-V joint. Conventional boots may then be installed. However, C-V joints must be disassembled with care, and reassembly is easily botched. If the shaft carries a vibration damper within its reach, additional assembly and reassembly will be required.

The skills and time required for successful fit-up of C-V joints has prompted many technicians to replace the entire axle including shafts, joints and boots as a complete unit. The cost differential to the customer between one needed flexible boot and one complete axle assembly can be readily appreciated.

Therefore it is desirable from the customer's viewpoint to replace the failed boot only. Several methods to reduce the labor and risk incurred by complete removal and axle disassembly are in present use. Two methods may be remarked upon, both of which find their best use in replacing the outer boot only, and both of which, unfortunately, compromise boot performance to some degree.

One method uses a type of boot having a lengthwise split or two in its casing. Mating sides of the split carry cooperating elements that locate against each other when the boot is properly assembled around the C-V joint. The split side must be carefully fastened together with screws, rivets, or adhesives according to the particulars of the design. Localized and unusual stress patterns adversely affect the life of such units. U.S. Pat. No. 5,845,911 by Gimino and U.S. Pat. No. 6,139,027 by Biekx address this method. Such a device is offered by J. C. Whitney Co. as part WA556587U.

In another system the smaller shaft end of the boot is stretched radially to pass over the joint housing. A special expanding shoe stretches the shaft end to the housing diameter and holds it there as the boot is forced off the shoe and over the joint housing. The degree of stretch required is formidable. As an example a typical C-V joint may have an input shaft diameter of 30 mm and a housing diameter of 80 mm representing a peripheral increase from 94 to 280 mm. Therefore a significant reduction from the typical boot wall thickness, and choice of a more stretchable material, is often required. An example of a tool for such boot stretching is claimed in patent publication 2004/0261238 by Boudreault. Inner boots cannot be replaced by this stretching method if an intervening vibration damper (which is close to the housing in size) is mounted on the shaft.

With all methods not using a split boot casing, partial dis-assembly of the outer axle support is required to give surrounding access to the C-V joint.

OBJECTS OF THE INVENTION a. The first object is to provide a replacement constant velocity joint boot for an automotive axle which may be slipped into place over the joint outer housing without removing the entire shaft from the differential housing or separation of a C-V joint.

b. The second object is to deliver a means by which the diameter of the smaller shaft end of a boot may be opened up by means of hand stretching only so that it may pass smoothly over the much larger housing end of the joint.

c. The third object is to create a system of specially shaped cooperating members whereby the small boot end may be first expanded for passage over the joint housing and then compacted down to the shaft diameter neatly and accurately.

d. The fourth object is to structure the pleated elements of the expandable boot end so that after compression by a securing clamp there are no outward leaks of the contained lubricating fluid or entry of undesirable external fluids or abrasive debris.

e. The fifth object is to free the boot designer to choose a boot material and thickness that performs well in terms of toughness, chemical resistance, flexibility, heat/cold and scuff resistance, without regard for the stretchability required to force a shaft sized boot end over a much larger joint housing.

f. The sixth object is to provide a boot that will pass over C-V housing-sized intervening devices mounted on the inner reach of an axle (such as a vibration damper) so that inner and outer boots can be changed together, if so desired.

g. The seventh object is to provide cooperating elements on the contacting rubber faces of the boot pleats which engage each other at the time of boot assembly to prevent any axial squirming motion during the clamping process or during subsequent use.

h. The eighth object is to aid the manner of manufacturing and assembling the automotive half-axle itself. Presently available non-expandable boots must be slid onto the half axle before C-V element assembly. This practice requires the machining of splines on each end of the axle at the joint location, and match machining the C-V joint mating parts. End-wise retaining grooves and parts are also needed. Since the boot herein described allows boot passage over objects much larger than the shaft, the internal joint elements can be made integral with the shaft ends themselves, thus minimizing both the machining and assembly process as well as permitting a smaller diameter unit.

SUMMARY

This application provides to the mechanical industries, and the automotive industry in particular, a structure for a flexible boot capable of being radially compressed at an extremity from a given expanded diameter to a given smaller diameter. This attribute is expected to aid in the assembly of such boots over the C-V joints of vehicles without full axle removal or C-V joint separation. The boot is not split or glued and does not rely on special tools or extreme material stretch for assembly. In addition, by permitting the use of forged or welded axle ends, this expandable boot offers automotive half axle makers the means to fabricate a less expensive, lighter, and more reliable product.

BRIEF DESCRIPTIONS OF THE DRAWINGS

FIG. 4 is a side view of the pleated section of the boot (half section) partially spread apart into its partially expanded configuration.

FIG. 5 is an end-on view of the same boot section as FIG. 4, again illustrating the pleats spread apart into the partially expanded configuration.

FIG. 6 shows a quarter end corner view of a boot with twice the number of spreadable pleats.

FIG. 7 illustrates the boot type of FIG. 1 having the shaft contacting inner boot wall portion extended axially outward along the shaft. The extended boot portion engaging the shaft can accommodate a second clamp.

FIG. 8 is a partial side view of the boot type of FIG. 1 showing cooperating locking elements molded into the pleated members.

FIG. 9 illustrates a boot having an expandable structure at each end. The boot envelops joint elements forged or welded onto the shaft. Each expandable end of the boot engages the shaft.

DESCRIPTION OF THE INVENTION

Figure 1:
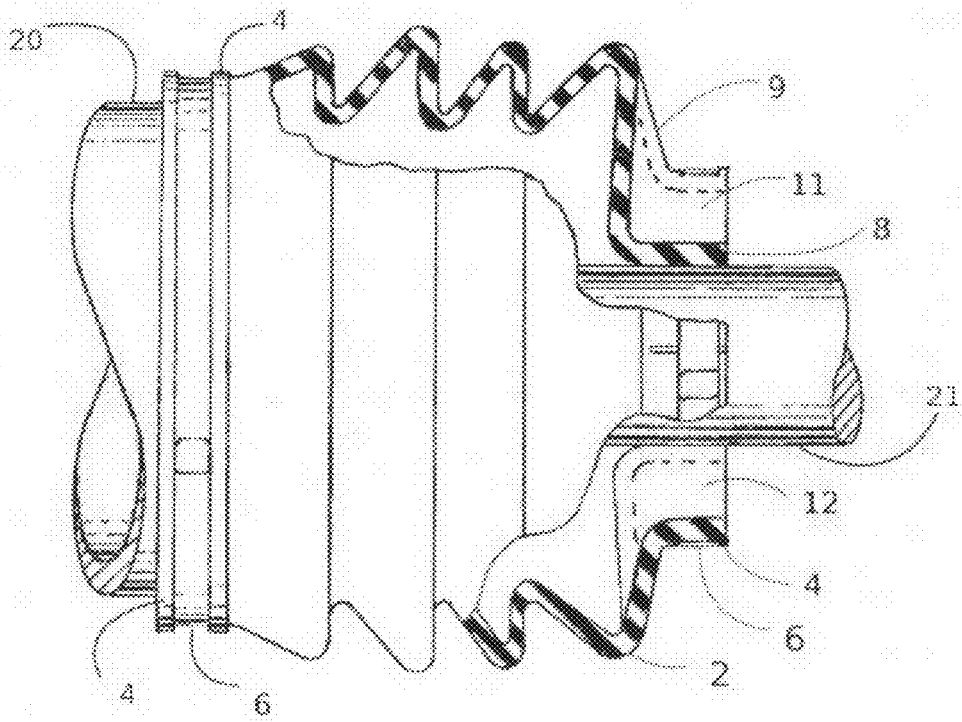
FIG. 1 is a side view of the of the boot of this disclosure, in this case one end of the boot is expandable and is engaging the shaft; the other end of the boot is engaging the joint housing. The boot is shown in an installed and clamped position over a typical automotive constant velocity joint.
Figure 3:
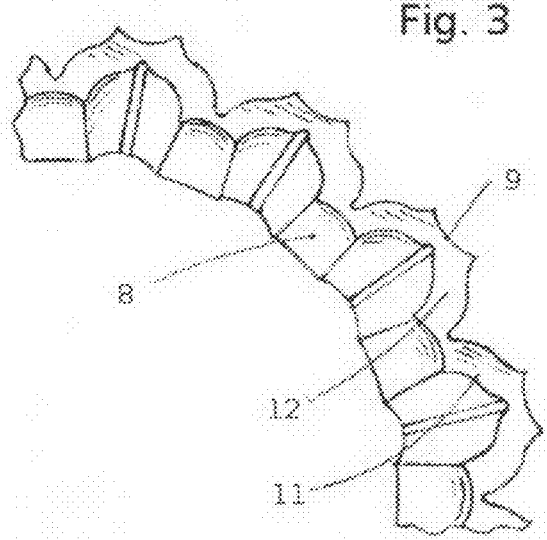
FIG. 3 is a one quarter axial view of the spread pleats of an almost fully expanded boot.

The boot 2 as shown in FIG. 1 or FIG. 8 disclosed herein is constructed with spreadable pleated elements on its shaft 21 contacting end. This description will show how these pleated elements 8 may be configured so as to achieve a large entry opening when the pleats are spread apart, as in FIGS. 3, 4, and 5, then pressed together to contact a smaller shaft 21 into a nested configuration, where it forms a seal. In its expanded condition the sleeve-like boot may be slipped, and if necessary tugged, over a flange or housing. Once over the housing 20 the expanded end may then be released whereupon it will retract to its molded condition. When in the retracted, molded condition a tensioning clamp 6, which surrounds the pleated end of the boot, can be applied to squeeze the pleats together against the shaft, forming a seal. In FIG. 1, boot 2 is clamped to a shaft 21 and housing 20, which are connected by an angularly bendable joint within housing 20. When the internal joint is bent at an angle as in a front-wheel drive C-V joint application, annular convolutions 24 on boot 2 allow the boot to bend by deforming the annular convolutions 24 without the boot contacting the joint or damaging the boot 2.

When used as an automotive C-V joint boot, as shown in FIG. 1 the pleated spreadable elements 8 9, 11, and 12 (see FIGS. 4 and 5), will be on one end only, with the opposite housing 20 end of the boot 2 being larger and with a plain cylindrical form without pleats. The material of the boot 2 will be chosen to have the qualities previously mentioned, such as longevity, flexibility, toughness, heat tolerance and chemical resistance, etc.

Boot Structure

A boot mounted and clamped over an automotive C-V joint will appear as in FIG. 1. One end of the boot clamps around the large diameter C-V joint housing 20. The opposite end of the C-V joint boot clamps around the much smaller drive shaft 21. The boot extends from the housing 20 to the shaft 21, thereby containing the C-V joint in a flexible, sealed envelope 2. The containing structure itself consists of a rubbery peripherally convoluted sleeve 2. A band clamp 6 secures the housing end of the boot. A similar clamp 6 also secures the shaft end of the boot. The boot 2 forms a leak proof protective envelope, or sealed envelope when both ends are in the clamped configuration.

Figure 2:
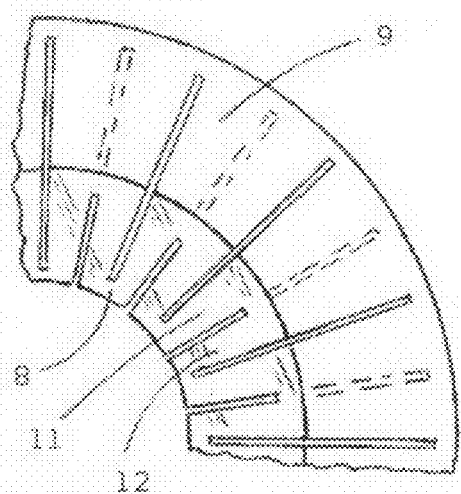
FIG. 2 is a shaft end corner view of one quarter section of a boot in an installed condition before tightening of a surrounding clamp.

The shaft end of the boot is comprised of a contiguous series of pleated elements forming a circumference of pleats which surround the shaft. The innermost pleat elements 8 as seen in FIGS. 1 through 6, mate against the shaft 21. The radially aligned elements of individual pleats 11 and 12 are joined at their inner extremity 8 and outer extremity 9 to form a contiguous structure. The elements 8, 9, 11, and 12 form an individual pleat. As seen in FIGS. 1, 2 and 6, when the shaft end of the C-V boot is in the clamped configuration, the circumference of pleats nest together to form a seal against the shaft. As seen in FIG. 4, the nested pleats first run axially along the shaft then turn through a corner 22 and project radially outward to the full boot diameter. As seen in FIGS. 4 and 5 where the shaft end of the C-V boot is in the un-clamped configuration, the pleats defined by 8, 9, 11, and 12 can be spread further until the inner circumference of the shaft end of the boot expands to a diameter defined by the housing 20. The boot end expansion is accomplished primarily by deformation rather than stretching of the boot material.

When in the clamped configuration, the shaft end of the C-V boot pleat elements 8, 9, 11, and 12 are compressed together upon the shaft 21 and secured by a circumferential band 6. A similar circumferential band 6 is used to secure the housing end of the C-V boot to the joint housing 20.

FIG. 7 illustrates the boot 2 of FIG. 1 having a means to more securely engage the boot to the shaft to restrain axial slippage. Extending pleated element 8 as shown in FIG. 7 provides a portion of said pleated elements 8 of sufficient width to accommodate both a first band clamp 6 and a second band clamp 6A. As seen in FIG. 7, formed circumferential lands 25 and 25A can be used to contain the first band clamp 6 and the second band clamp 6A to prevent the tensioning band clamps 6 and 6A from slipping off the boot.

FIG. 8 illustrates the contacting surfaces between adjacent pleat elements 11 and 12, where said surfaces are shaped to form an interlocking pair of surfaces. Said interlocking surfaces are designed to prevent axial slippage between adjacent pleats. These interlocking surfaces may be shaped as cooperating teeth 5 and 5A as shown in FIG. 8.

FIG. 9 illustrates an embodiment of the boot 2 with both ends of the boot formed with a series of pleated members 8, 9, 11 and 12 (see FIGS. 4 and 5) and clamped by bands 6 to the shafts 21 and 23 on each side of the joint. FIG. 9 illustrates the boot 2 forming a sealed protective envelope 2 to surround a universal joint constructed of drive elements 50 and 51 mounted on shafts 21 and 23. Boot 2 is clamped to shaft 21 and shaft 23, which are connected by an angularly bendable joint. Annular convolutions 24 in the center zone of the boot allow the boot 2 to bend preventing the boot 2 from contacting the joint drive elements 50 and 51 or otherwise collapsing while joint is in use in a bent or angular configuration.

Design Concerns

To aid in closure and assure proper assembly into the compacted configuration as shown in FIGS. 1, 2, 7 and 9, the pleat members of the boot should be molded in a condition as near that of their fully nested shape as the molding process permits. By the utilization of a molding process, for example either by injecting or pouring a material into a mold, a single contiguous boot is formed.

Referring to FIG. 1, the inside diameter of the convoluted middle section of the boot may be fractionally less in diameter than the housing itself to minimize the space occupied by the boot. During assembly the widely expanded shaft end of the boot is first slipped over the housing, the expanded pleats being grasped and used to draw the convoluted middle section over the lubricated and slippery housing. An important feature is that the rubbery sleeve is always pulled or drawn over the large mandrel—never pushed—thereby avoiding collapse or buckle which may cause assembly difficulties.

The peripheral convolutions used in conventional C-V joint boots are gradually reduced in diameter from the joint housing end toward the shaft end. Given consistent wall thickness this results in maximum flexure and thus maximum stress on the boot convolution adjacent to the joint housing. In the herein disclosed boot limited diameter reduction is permitted, therefore the stress pattern is likely to be more uniform. A more uniform cross-section throughout the boot should reduce peak stress.

The availability of the boot of this disclosure may permit the manufacture of automotive half axles with integral C-V joint hubs (forged, cast, or welded) at each end. Thus the practice of machining an external spline on the axle at the joint location, and generating matching internal splines on (now) separate C-V joint carriers, will be eliminated. Locating rings and grooves to axially position these carriers, will also be unnecessary. Integral units as suggested will be less expensive, lighter, dimensionally more true, and more dependable than existing designs—possible with an expandable boot.

| | |
|---|---|
| 2 | Shell of boot |
| 4 | Clamp retaining land |
| 5 | Projections on face of part 9 |
| 5A | Mating receivers opposing parts 5 |
| 6 | Compacting band clamp |
| 6A | Single layer shaft clamp |
| 8 | Shaft contacting pleat layer |
| 9 | External pleat layer |
| 11 | Connecting web - one face |
| 12 | Connecting web - opposite face |
| 25 | Shaft layer abutment |
| 20 | CV Joint housing |
| 21 | CV Joint axle |
| 22 | Pleat direction corner |

What is claimed is:

1. A flexible one piece boot generally of a sleeve shape appropriately sized to surround one or more drive elements mounted on two shafts connected by an angularly bendable joint,
   a) said boot having an annularly convoluted center zone surrounding said joint wherein angular bending occurs,
   b) said boot having extendable and compactible end structures sized to closely mate with said shafts,
   c) said compactible end structures comprised of a plurality of pleated elements that may be spread from a nested configuration to an expanded configuration,
   d) each of said pleated elements being seamlessly connected with its immediate neighbors to form a contiguous sleeve,
   e) said pleated elements shaped to mate with adjacent pleated elements and said end structures shaped to mate with said shafts when in said nested configuration and,
   f) clamping means surrounding said pleated elements to compact and maintain them in said nested configuration on said shafts to provide a leak-proof protective envelope.

2. A convoluted sleeve-like boot of flexible material, sized and shaped to surround the zone between a constant-velocity joint housing, and its associated axle,
   a) said boot having a cylindrical sleeve at one end to mate with said constant-velocity joint housing,
   b) said boot having an annularly convoluted middle zone where angular bending occurs,
   c) said boot having an opposite smaller end proportioned to mate with said axle,
   d) said smaller end comprised of a plurality of pleated elements that may be spread from a nested configuration to an expanded configuration,
   e) said pleated elements so shaped that they may be closed into a said nested configuration mating said axle,
   f) each of said pleated elements being seamlessly connected with its neighbors to form a contiguous sleeve and,
   g) clamping means surrounding said pleated elements to compact and maintain said pleated elements said nested configuration on said axle, to provide a leak-proof protective envelope,
   whereby said boot can be passed over said constant-velocity joint housing, and subsequently clamped at both ends to provide a sealed envelope for protection of drive elements within said joint housing.

3. A boot as in claim 2 where,
a) said pleated elements are shaped so that adjacent surfaces of said pleated elements are interlocking when compacted into the nested configuration,
whereby said pleated elements with said interlocking adjacent surfaces prevent axial slippage between adjacent pleats when compacted by said clamping means.

4. A boot as in claim 2 where,
a) a portion of said pleated elements mated to said axle is of sufficient width to accommodate a two band clamps
whereby axial motion of said boot with respect to said axle is restrained.

* * * * *